(12) United States Patent
Kim et al.

(10) Patent No.: US 8,966,511 B2
(45) Date of Patent: Feb. 24, 2015

(54) COMPUTER SYSTEM AND METHOD FOR PREVENTING DYNAMIC-LINK LIBRARY INJECTION ATTACK

(75) Inventors: Eun Ah Kim, Seoul (KR); Weon Il Jin, Suwon-si (KR); Hwan Joon Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 284 days.

(21) Appl. No.: 12/885,695

(22) Filed: Sep. 20, 2010

(65) Prior Publication Data

US 2011/0179430 A1 Jul. 21, 2011

(30) Foreign Application Priority Data

Jan. 18, 2010 (KR) ........................ 10-2010-0004506

(51) Int. Cl.
*G06F 9/44* (2006.01)
*G06F 11/00* (2006.01)
*G06F 17/30* (2006.01)
*G06F 21/55* (2013.01)
*G06F 9/445* (2006.01)

(52) U.S. Cl.
CPC .......... *G06F 21/554* (2013.01); *G06F 9/44521* (2013.01)
USPC ................................ 719/331; 726/22; 726/26

(58) Field of Classification Search
USPC ........................................ 719/331; 726/22, 26
See application file for complete search history.

(56) References Cited

U.S. PATENT DOCUMENTS

| | | | |
|---|---|---|---|
| 6,141,698 A | 10/2000 | Krishnan et al. | |
| 6,550,060 B1 | 4/2003 | Hammond | |
| 6,779,187 B1 * | 8/2004 | Hammond | 719/331 |
| 7,735,136 B2 * | 6/2010 | Mantripragada et al. | 726/22 |
| 7,971,255 B1 * | 6/2011 | Kc et al. | 726/24 |
| 8,104,090 B1 * | 1/2012 | Pavlyushchik | 726/24 |
| 8,127,316 B1 * | 2/2012 | Binotto et al. | 719/331 |
| 8,205,257 B1 * | 6/2012 | Satish et al. | 726/22 |
| 8,209,757 B1 * | 6/2012 | Kennedy et al. | 726/23 |
| 8,225,406 B1 * | 7/2012 | Nachenberg | 726/24 |
| 8,239,836 B1 * | 8/2012 | Franz et al. | 717/127 |
| 8,739,283 B1 * | 5/2014 | Zhang et al. | 726/24 |
| 2003/0159070 A1 * | 8/2003 | Mayer et al. | 713/201 |
| 2005/0240906 A1 | 10/2005 | Kinderknecht et al. | |
| 2006/0136890 A1 * | 6/2006 | Jodh | 717/163 |
| 2006/0230451 A1 * | 10/2006 | Kramer et al. | 726/22 |
| 2006/0282827 A1 * | 12/2006 | Yeap et al. | 717/130 |
| 2007/0240212 A1 * | 10/2007 | Matalytski | 726/22 |
| 2007/0240222 A1 * | 10/2007 | Tuvell et al. | 726/24 |
| 2007/0260880 A1 * | 11/2007 | Satterlee et al. | 713/164 |

(Continued)

FOREIGN PATENT DOCUMENTS

KR 10-2008-0043209 5/2008

OTHER PUBLICATIONS

Springer Link "Malyzer: Defeating Anit-detection for Application-Level Malware Analysis" Applied Cryptography and Network Security 2009 pp. 201-218.*

*Primary Examiner* — Charles E Anya
(74) *Attorney, Agent, or Firm* — NSIP Law (57) ABSTRACT

A computer system and method for preventing a Dynamic-Link Library (DLL) injection attack are provided. The computer system monitors an operation where a process attempts to dynamically link an executable code library to another process, and intercepts the dynamic link of the executable code library.

15 Claims, 4 Drawing Sheets

(56) References Cited

U.S. PATENT DOCUMENTS

| | | | |
|---|---|---|---|
| 2008/0022378 A1* | 1/2008 | Repasi et al. | 726/5 |
| 2008/0066179 A1* | 3/2008 | Liu | 726/24 |
| 2008/0243965 A1* | 10/2008 | Jung et al. | 707/206 |
| 2009/0049550 A1* | 2/2009 | Shevchenko | 726/23 |
| 2009/0070878 A1* | 3/2009 | Wang et al. | 726/24 |
| 2009/0077664 A1* | 3/2009 | Hsu et al. | 726/24 |
| 2009/0089878 A1* | 4/2009 | Monastyrsky et al. | 726/22 |
| 2009/0133126 A1* | 5/2009 | Jang et al. | 726/24 |
| 2009/0165132 A1* | 6/2009 | Jain et al. | 726/22 |
| 2010/0043072 A1* | 2/2010 | Rothwell | 726/24 |
| 2010/0293615 A1* | 11/2010 | Ye | 726/22 |
| 2011/0131657 A1* | 6/2011 | Nojiri | 726/25 |
| 2013/0276119 A1* | 10/2013 | Edwards | 726/24 |

\* cited by examiner

COMPUTER SYSTEM AND METHOD FOR PREVENTING DYNAMIC-LINK LIBRARY INJECTION ATTACK

CROSS-REFERENCE TO RELATED APPLICATION

This application claims the benefit under 35 U.S.C. §119(a) of Korean Patent Application No. 10-2010-0004506, filed on Jan. 18, 2010, in the Korean Intellectual Property Office, the entire disclosure of which is incorporated herein by reference for all purposes.

BACKGROUND

1. Field

The following description relates to a computer system and method for preventing a Dynamic-Link Library (DLL) injection attack.

2. Description of Related Art

Conventional antivirus products examine patterns of virus codes inside libraries based on a virus' signature, determine whether an attack by a virus code occurs, and attempt to prevent the attack from occurring in the future. Accordingly, conventional antivirus products contain a database that includes only viruses that have already been found and that are already known. Thus, it is inevitable that the database of the conventional antivirus products will need to be updated with information about newly found viruses. For example, if a database has not been updated with information pertaining to a newly found virus, an antivirus program will not be able to recognize or respond to a new malicious code of the newly found virus, even though the new malicious code has previously been encountered.

Therefore, there is a demand for a system and method for efficiently preventing a Dynamic-Link Library (DLL) injection attack.

SUMMARY

In one general aspect, there is provided a computer system comprising a monitoring unit to monitor an operation by which a first process attempts to dynamically link an executable code library to a second process, and an intercept unit to intercept the link of the executable code library when the operation occurs.

The monitoring unit may comprise a call determination unit to determine whether a thread creation function is called, and a connection checking unit to check whether the operation occurs using a parameter of a function, wherein the function is executed by function hooking at a point in time when the thread creation function is called.

The parameter may comprise a target process, a function to be executed by a thread to be created, and a parameter of the function to be executed, and the connection checking unit may check that the operation occurs when the target process is different from the first process, the thread is used to execute a function for loading a code library, and the parameter of the function to be executed is a name of a file of the executable code library.

The monitoring unit may comprise a call determination unit to determine whether a thread creation function is called, and the intercept unit may comprises a connection checking unit to check whether the operation occurs using a parameter of a function, wherein the function is executed by function hooking at a point in time when the thread creation function is called, and a termination unit to terminate a thread that is created in association with the operation.

The parameter may comprise a target process, a function to be executed by a thread to be created, and a parameter of the function to be executed, and the connection checking unit may check that the operation occurs when the target process is different from the first process, the thread is used to execute a function for loading a code library, and the parameter of the function to be executed is a name of a file of the executable code library.

The intercept unit may terminate a thread created in association with the operation and intercept the link.

The computer system may further comprise an interface unit to receive a user's input and to determine whether to operate the monitoring unit based on the user's input.

The computer system may further comprise an interface unit to output information about an occurrence of the operation using an output device.

The executable code library may comprise a Dynamic Link Library (DLL).

In another aspect, there is provided a method of preventing a library injection attack in a computer system, the method comprising monitoring an operation by which a first process attempts to dynamically link an executable code library to a second process, and intercepting the link of the executable code library when the operation occurs.

The monitoring may comprise determining whether a thread creation function is called, and checking whether the operation occurs using a parameter of a function, wherein the function is executed by function hooking at a point in time when the thread creation function is called.

The parameter may comprise a target process, a function to be executed by a thread to be created, and a parameter of the function to be executed, and the checking may comprise checking that the operation occurs when the target process is different from the first process, the thread is used to execute a function for loading a code library, and the parameter of the function to be executed is a name of a file of the executable code library.

The monitoring may comprise determining whether a thread creation function is called, and the intercepting may comprise checking whether the operation occurs using a parameter of a function, the function being executed by function hooking at a point in time when the thread creation function is called, and terminating a thread that is created in association with the operation.

The parameter may comprise a target process, a function to be executed by a thread to be created, and a parameter of the function to be executed, and the checking may comprise checking that the operation occurs when the target process is different from the first process, the thread is used to execute a function for loading a code library, and the parameter of the function to be executed is a name of a file of the executable code library.

The intercepting may comprise terminating a thread created in association with the operation, and intercepting the link.

The method may further comprise determining whether to monitor the operation based on a user's input.

The method may further comprise outputting information concerning an occurrence of the operation using an output device.

In another aspect, there is provided a computer-readable storage medium storing a program to cause a processor to execute a method of preventing a library injection attack in a computer system, the method comprising monitoring an operation by which a first process attempts to dynamically link an executable code library to a second process, and intercepting the link of the executable code library when the operation occurs.

The monitoring may comprise determining whether a thread creation function is called, and checking whether the operation occurs using a parameter of a function, wherein the function is executed by function hooking at a point in time when the thread creation function is called.

The parameter may comprise a target process, a function to be executed by a thread to be created, and a parameter of the function to be executed, and wherein the checking comprises checking that the operation occurs when the target process is different from the first process, the thread is used to execute a function for loading a code library, and the parameter of the function to be executed is a name of a file of the executable code library.

Other features and aspects may be apparent from the following description, the drawings, and the claims.

BRIEF DESCRIPTION OF THE DRAWINGS

Throughout the drawings and the description, unless otherwise described, the same drawing reference numerals should be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, description of well-known functions and constructions may be omitted for increased clarity and conciseness.

A computer system may be operated by executing programs. For example, the computer system may include a system that enables automatic calculation or data processing using an electric circuit, for example a personal computer (PC), a mobile terminal, and the like. A program may be executed at each process, and one or more threads may be executed in a single process. By creating new threads, predetermined functions may be newly initiated in parallel within a program. For example, a function may be newly executed in a location when a new thread is created.

Functions used in a program may be modulated in a library such as an executable file format, and may be stored in the computer system. The program may enable a link to the library such that desired functions may be used within the library. This operation of the program is referred to as a "link." A scheme of linking a library to a program may be classified into a static link scheme and a dynamic link scheme such as a run-time link scheme. For example, the static link scheme may enable a library to be injected into a program at compile-time, and the dynamic link scheme may enable a library to be loaded and used during execution of a program.

The "loading" of the library may include storing the library in a virtual memory space of a process and calling a desired function in order to use the function. Such a loadable library file may be, for example, a Dynamic-Link Library (DLL) file.

Figure 1:
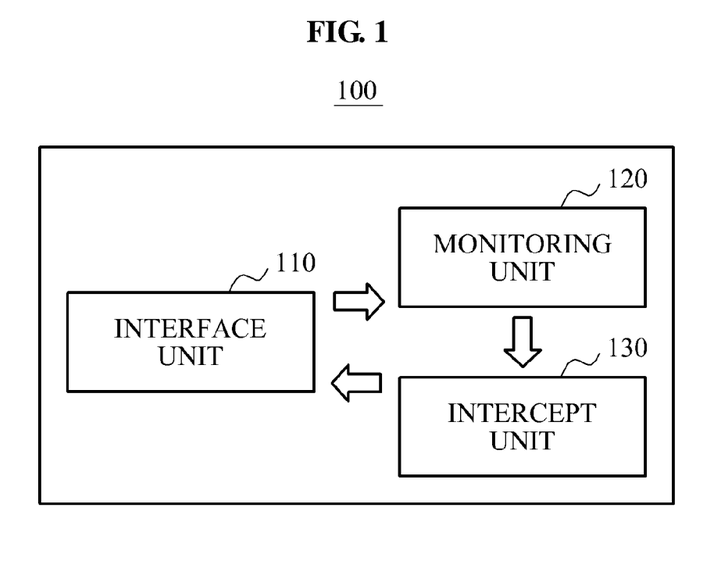
FIG. 1 is a diagram illustrating an example of a computer system.

FIG. 1 illustrates an example of a computer system. In the example of FIG. 1, computer system 100 includes an interface unit 110, a monitoring unit 120, and an intercept unit 130.

The interface unit 110 may determine whether to operate the monitoring unit 120 based on a user's input. For example, to determine whether to operate the computer system 100, the interface unit 110 may receive the user's input using an output device such as a monitor, in a software manner, and/or using a predetermined key, in a hardware manner. For example, in a mobile system, a user may press/depress a predetermined button to set a manner mode. That is, a separate button may be provided to determine whether to operate the monitoring unit 120.

The monitoring unit 120 may monitor an operation of a first process that attempts to dynamically link an executable code library to a second process. The executable code library may be, for example, a DLL file in a Windows® Operating System (OS). In this example, the first process may create a thread in the second process using a function, for example a "RemoteCreateThread" function. The "RemoteControlThread" may have parameters, for example, a target process, a function to be executed by a thread, and a parameter of the function to be executed. In other words, the DLL file in which a malicious code is injected may be executed by the target process. Accordingly, the monitoring unit 120 may monitor whether an external process injects the dynamically linkable and executable code library.

The monitoring unit 120 may determine whether a thread creation function is called. In some embodiments, the monitoring unit 120 may determine whether a thread creation function is called, and also whether an attack on the target process occurs.

For example, the monitoring unit 120 may include a call determination unit (not shown) to determine whether a thread creation function is called. As another example, the monitoring unit 120 may include the call determination unit and also a connection checking unit (not shown). The connection checking unit may check whether the operation occurs. For example, the connection checking unit may check whether the operation occurs based on a parameter of a function which is to be executed by function hooking at a point in time when the thread creation function is called. In this example, the parameter of the function may include a target process, a function to be executed by a thread to be created, and a parameter of the function to be executed. The connection checking unit may verify the operation occurs when the target process is different from the first process, the thread is used to execute a function for loading a code library, and the parameter of the function to be executed is a name of a file of the executable code library.

The intercept unit 130 may intercept a link of the executable code library when the operation occurs. In some embodiments, the intercept unit 130 may include the connection checking unit to determine whether an attack on the target process occurs, instead of the monitoring unit 120. Alternatively, when the monitoring unit 120 includes both the call determination unit and the connection check unit, the intercept unit 130 may intercept the link of the executable code library. Also, when the operation occurs, the intercept unit 130 may include a termination unit (not shown) to terminate a thread created in association with the occurrence of the operation. For example, the computer system 100 may determine whether a process creates a thread in a currently executed process which attempts to attack the currently executed process. When the attack is determined to occur, the intercept unit 130 may terminate the created thread, and may intercept the dynamic link of the executable code library to the currently executed process. Accordingly, it is possible to prevent unintentional operations from being performed and it is possible to prevent a library injection attack.

The interface unit 110 may output information about the occurrence of the operation using an output device. For example, when a library injection attack occurs, the interface unit 110 may display information, for example, an alert message stating that the library injection attack is intercepted. For example, the information may be displayed on a monitor, a liquid crystal, and the like, of a mobile system.

Figure 2:
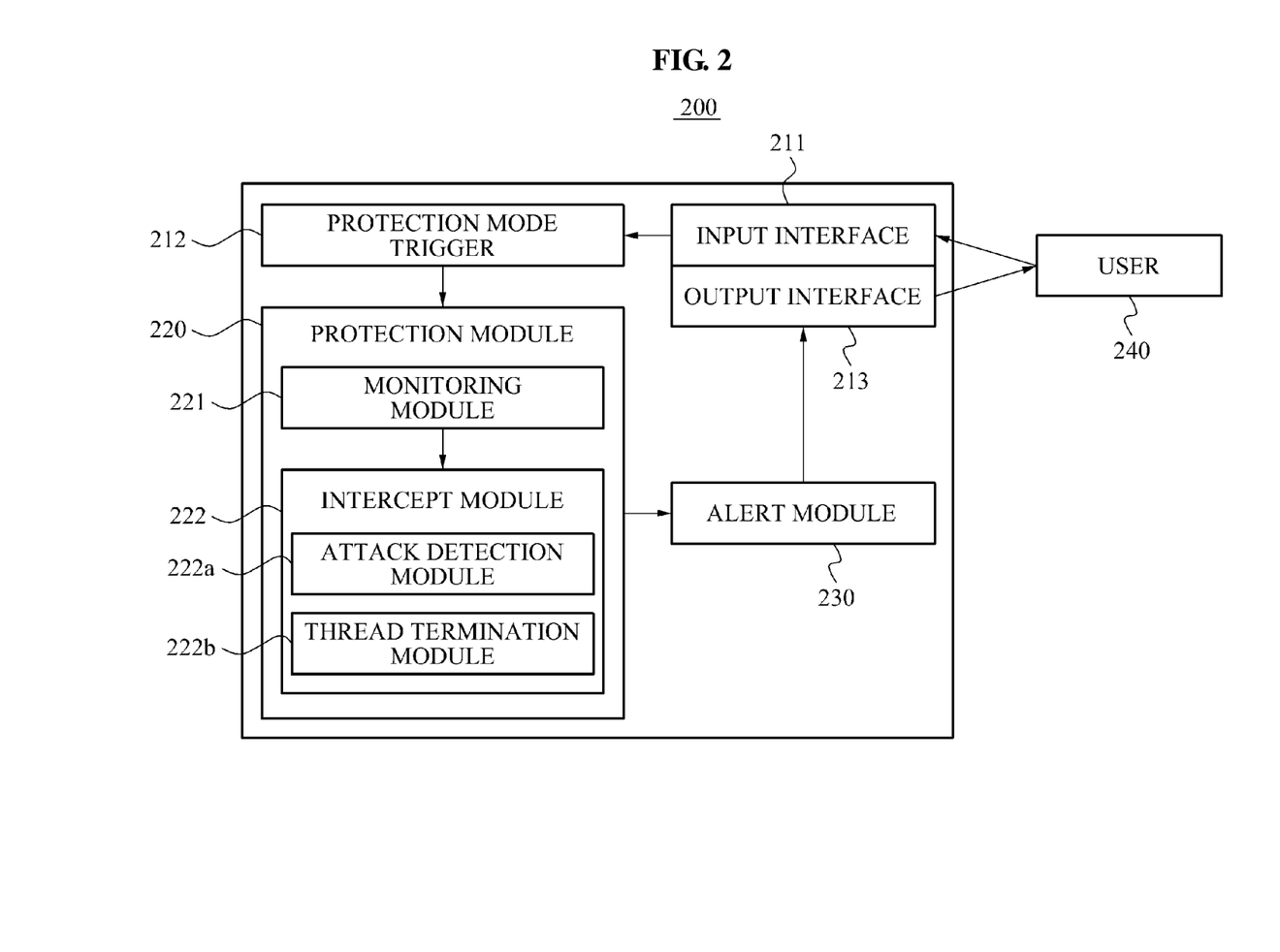
FIG. 2 is a diagram illustrating another example of a computer system.

FIG. 2 illustrates another example of a computer system. In the example of FIG. 2, computer system 200 includes an input interface 211, a protection mode trigger 212, an output interface 213, a protection module 220, and an alert module 230. In this example, the input interface 211, the protection mode trigger 212, the output interface 213, and the alert module 230 may perform similar functions as the interface unit 110 described above with reference to FIG. 1. The protection module 220 may perform similar functions as the monitoring unit 120 and the intercept unit 130 described above with reference to FIG. 1.

The input interface 211 may receive an input from a user 240. For example, the input interface 211 may receive an input from the user 240 regarding whether to intercept a dynamic link of a code library using functions. As described above, the functions may be provided in a software manner or in a hardware manner.

The protection mode trigger 212 may execute the protection module 220 according to the input of the user 240. For example, when the user 240 sets an intercept mode, the protection module 220 may be triggered by the protection mode trigger 212. When the input interface 211 enables the user 240 to use the function provided in the hardware manner, and the input interface 211 receives an input to intercept the dynamic link, the protection mode trigger 212 may change the input of the user 240 to a software input.

The protection module 220 may check and intercept the dynamic link of the executable code library. Accordingly, the protection module 220 may include a monitoring module 221 and an intercept module 222 to perform the check and intercept, respectively.

The monitoring module 221 may monitor whether the thread creation function is called and may take control of a program at a point in time when a thread creation function is called. In this example, the thread creation function may enable the executable code library to be dynamically linked. To determine whether the thread creation function is called, the monitoring module 221 may monitor a function initially called by the thread creation function.

The intercept module 222 may be executed after the monitoring module 221 has taken control of the program. The intercept module 222 may include an attack detection module 222*a* and a thread termination module 222*b*. The attack detection module 222*a* may detect whether the executable code library is likely to be injected by the thread creation function. The thread termination module 222*b* may terminate a thread which is created to dynamically link the executable code library to another process.

The alert module 230 may generate information to notify a user that the executable code library is dynamically linked. In addition, the output interface 213 may provide the user 240 with the information generated by the alert module 230.

The computer systems 100 and 200 shown in FIGS. 1 and 2 enable a user to determine whether to intercept the dynamic link of the executable code library. In addition, the computer systems 100 and 200 enable the user the ability to select whether to terminate the thread when the executable code library is dynamically linked.

Figure 3:
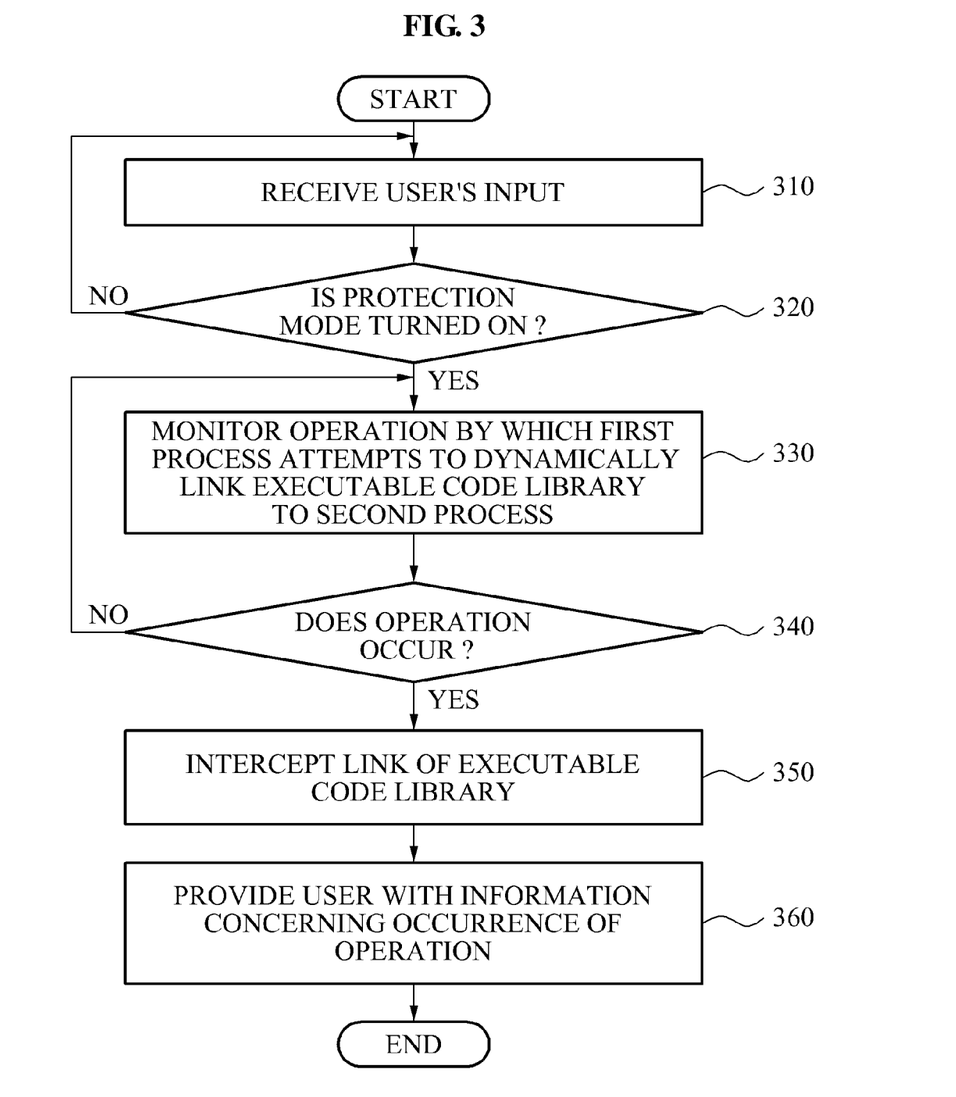
FIG. 3 is a flowchart illustrating an example of a method for preventing a Dynamic-Link Library (DLL) injection attack.

FIG. 3 illustrates a method of preventing a DLL injection attack. For example, the method shown in FIG. 3 may be performed by the computer system 100 described with reference to FIG. 1 or the computer system 200 described with reference to FIG. 2.

In 310, a computer system receives a user's input. As described above, the user's input may be received using an output device, such as a monitor, in a software manner, or using a predetermined key in a hardware manner, to determine whether to operate the computer system. For example, in a mobile system, a user may depress a predetermined button to set a manner mode. That is, a separate button may be provided to determine whether to operate the computer system.

In 320, the computer system turns on a protection mode according to the user's input. For example, to turn on the protection mode, the computer system may operate the monitoring unit 120 as described above with reference to FIG. 1, or may execute the protection module 220 as described above with reference to FIG. 2. When the protection mode is turned on, the computer system may perform 330. Alternatively, when the protection mode has not yet been turned on, the computer system may perform 310 again.

In 330, the computer system monitors a first process that attempts to dynamically link an executable code library to a second process. In this example, the computer system may determine whether a thread creation function is called. In some embodiments, the computer system may determine whether a thread creation function is called, and then whether an attack to the target process occurs.

For example, the computer system may determine whether a thread creation function is called, in 330. In some embodiments, the computer system may determine whether a thread creation function is called and also check whether the operation occurs. The check may be performed based on a parameter of a function which is to be executed by function hooking at a point in time when the thread creation function is called. In this example, the parameter of the function may include a target process, a function to be executed by a thread to be created, and a parameter of the function to be executed. The computer system may verify that the operation occurs if the target process is different from the first process, the thread is used to execute a function for loading a code library, and the parameter of the function to be executed is a name of a file of the executable code library.

When the operation is determined to occur in 340, the computer system may perform 350. Alternatively, when the operation is determined not to occur, the computer system may perform 330 again. In other words, the computer system may continue to monitor the whether the operation occurs.

In 350, the computer system intercepts a link of the executable code library. When monitoring whether the thread creation function is called in 330, the computer system may check whether the operation occurs based on a parameter of a function which is to be executed by function hooking at a point in time when the thread creation function is called, in 350.

For example, when the operation occurs the computer system may terminate a thread created in association with the operation, to intercept the link of the executable code library. For example, the computer system may determine whether a process creates a thread in a currently executed process that is generated to attack the currently executed process. When the attack is determined to occur, the computer system may terminate the created thread, and may intercept the dynamic link of the executable code library to the currently executed process. Thus, it is possible to prevent unintentional operations from being performed. Accordingly, it is possible to prevent a library injection attack.

In 360, the computer system provides a user with information about the occurrence of the operation. The computer system may output the information about the occurrence of the operation using an output device. For example, when a library injection attack occurs, the computer system may display information such as an alert message stating that the library injection attack is intercepted. The alert message may be displayed, for example, on a monitor, a liquid crystal display, and the like of a mobile system.

Figure 4:
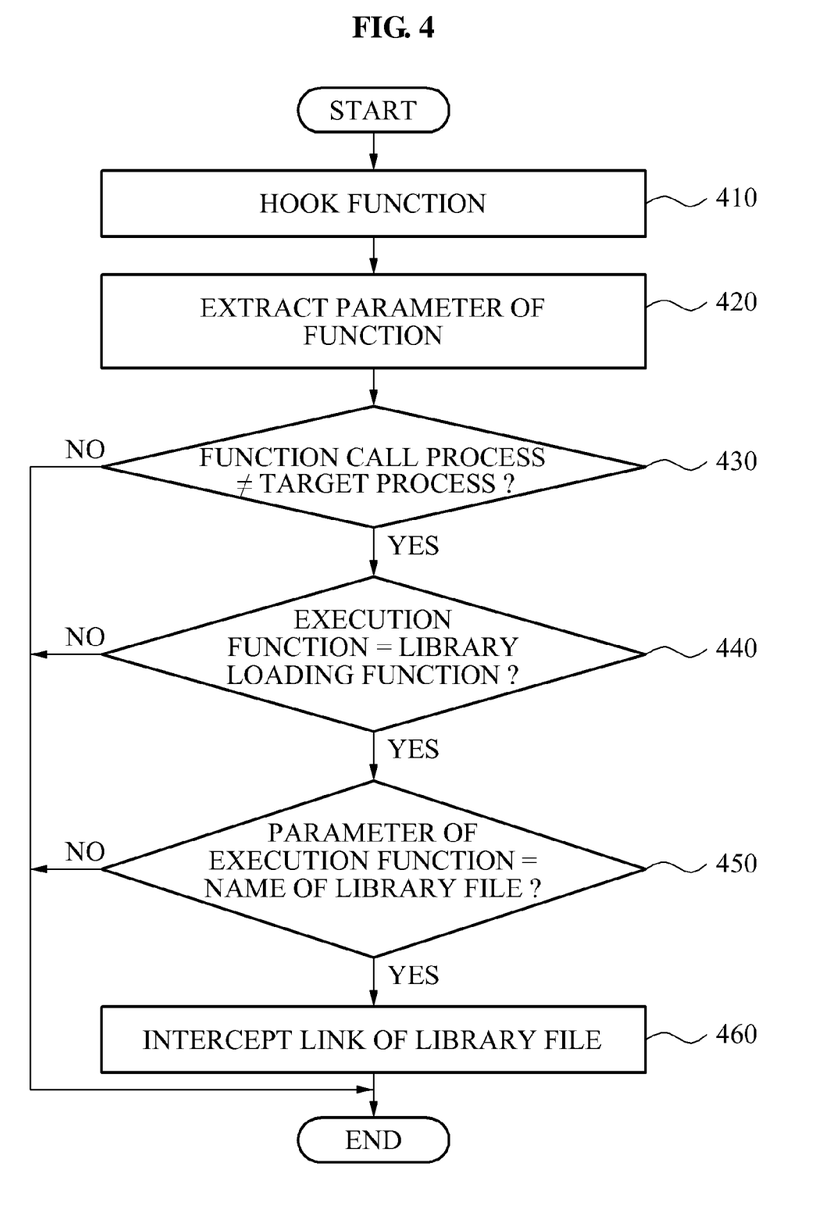
FIG. 4 is a flowchart illustrating a method for determining whether a library injection occurs.

FIG. 4 illustrates an example of a method for determining whether a library injection occurs. The method shown in FIG. 4 may be performed, for example, by the computer system 100 described with reference to FIG. 1 or the computer system 200 described with reference to FIG. 2. For example, operations 410 to 450 shown in FIG. 4 may be performed in operation 330 or operation 350 shown in FIG. 3.

In 410, the computer system hooks a function. For example, when a thread creation function is called, the computer system may hook the thread creation function to take control of a program.

In 420, the computer system extracts a parameter of the hooked function. The parameter of the hooked function may include, for example, a target process, a function to be executed by a thread to be created, and a parameter of the function to be executed by the thread, as described above.

In 430, the computer system determines whether a function call process is the same as a target process. In this example, the function call process refers to a process that calls the thread creation function, and the target process refers to a process targeted by the thread creation function. When the function call process is determined to differ from the target process, the computer system may perform 440. Alternatively, when the function call process is determined to be the same as the target process, the computer system may stop determining whether the library injection occurs.

In 440, the computer system determines whether an execution function is a library loading function. In this example, the execution function refers to a function executed by a thread to be created, and the library loading function refers to a function used to load a code library. When the execution function is determined to be the library loading function, the computer system may perform 450. Alternatively, when the execution function is determined to differ from the library loading function, the computer system may stop determining whether the library injection occurs.

In operation 450, the method determines whether a parameter of the execution function is a name of a library file. If the parameter of the execution function is a name of a library file, the computer system may perform 460. Alternatively, when the parameter of the execution function is different from the name of the library file, the computer system may stop determining whether the library injection occurs. In this example, the library file may include a dynamically linkable and executable library file.

Accordingly, if the function call process is different from the target process, the computer system may recognize that an external process attempts to create a thread in a currently executed process. When the execution function is the library loading function, and when a name of a dynamically linked executable library file is used as a parameter of the execution function, the computer system may determine that the library injection attack occurs.

In 460, the computer system intercepts a link of the library file. For example, the computer system may determine whether a process creates a thread in a currently executed process to attack the currently executed process. When the attack is determined to occur, the computer system may terminate the created thread, and may intercept the dynamic link of the executable code library to the currently executed process. Accordingly, it is possible to prevent unintentional operations from being performed.

As described above, according to the computer system and the method of preventing the library injection attack, it is possible to monitor an operation by which a process attempts to dynamically link an executable code library to another process, and to intercept the dynamic linking of the executable code library, to thereby prevent unintentional operations from being performed. Also, it is possible to prevent a DLL injection attack without implementation of a separate database.

As a non-exhaustive illustration only, the terminal device described herein may refer to mobile devices such as a cellular phone, a personal digital assistant (PDA), a digital camera, a portable game console, an MP3 player, a portable/personal multimedia player (PMP), a handheld e-book, a portable laptop personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

The above-described methods may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A computer system comprising:
   a monitoring unit configured to monitor an injection operation by which a first process attempts to dynamically link an executable code library to a second process, the monitoring unit comprising a connection checking unit configured to determine that the injection operation occurs by determining that the first process attempts to create a thread in the second process, and by determining that a function of the created thread that is yet to be executed by the second process, will cause the second process to load the executable code library to the second process; and
   an intercept unit configured to intercept the dynamic link of the
   executable code library in response to the injection operation occurring,
   wherein the connection checking unit further checks whether the second process differs from the first process and whether a parameter of the function to be executed by the thread is a name of the executable code library,
   wherein the connection checking unit further checks whether the second process differs from the first process and whether a parameter of the function to be executed by the thread is name of the executable code library.

2. The computer system of claim 1, wherein the monitoring unit further comprises a call determination unit configured to determine whether a thread creation function is called, and
   the parameter of the function is obtained by function hooking at a point in time when the thread creation function is called.

3. The computer system of claim 1, wherein the intercept unit comprises:
   a termination unit configured to terminate a thread that is created in association with the injection operation.

4. The computer system of claim 1, wherein the intercept unit terminates a thread created in association with the injection operation and intercepts the link.

5. The computer system of claim 1, further comprising:
   an interface unit to receive a user's input and to determine whether to operate the monitoring unit based on the user's input.

6. The computer system of claim 1, further comprising:
   an interface unit to output information about an occurrence of the injection operation using an output device.

7. The computer system of claim 1, wherein the executable code library comprises a Dynamic Link Library (DLL) and the injection operation comprises a DLL injection.

8. A method of preventing a library injection attack in a computer system, the method comprising:
   monitoring an injection operation by which a first process attempts to dynamically link an executable code library to a second process, the monitoring comprising determining that the injection operation occurs by determining that the first process attempts to create a thread in the second process, and by determining that a function of the created thread that is yet to be executed by the second process, will cause the second process to load the executable code library to the second process; and
   intercepting the dynamic link of the executable code library in response to the injection operation occurring,
   wherein the monitoring further checks whether the second process differs from the first process and whether a parameter of the function to be executed by the thread is name of the executable code library.

9. The method of claim 8, wherein the monitoring further comprises determining whether a thread creation function is called, and
   the parameter of the function is obtained by function hooking at a point in time when the thread creation function is called.

10. The method of claim 8, wherein the intercepting comprises terminating a thread that is created in association with the injection operation.

11. The method of claim 8, wherein the intercepting comprises terminating a thread created in association with the injection operation, and intercepting the link.

12. The method of claim 8, further comprising:
    determining whether to monitor the injection operation based on a user's input.

13. The method of claim 8, further comprising:
    outputting information concerning an occurrence of the injection operation using an output device.

14. A non-transitory computer-readable storage medium storing a program to cause a processor to execute a method of preventing a library injection attack in a computer system, the method comprising:
    monitoring an injection operation by which a first process attempts to dynamically link an executable code library to a second process, the monitoring comprising determining that the injection operation occurs by determining that the first process attempts to create a thread in the second process, and by determining that a function of the thread that is yet to be executed by the second process, will cause the second process to load the executable code library to the second process; and
    intercepting the link of the executable code library in response to the injection operation occurring,
    wherein the monitoring further checks whether the second process differs from the first process and whether a parameter of the function to be executed by the thread is name of the executable code library.

15. The computer readable storage medium of claim 14, wherein the monitoring further comprises determining whether a thread creation function is called, and
    the parameter of the function is obtained by function hooking at a point in time when the thread creation function is called.

* * * * *